United States Patent
Musgrove

[15] 3,683,432
[45] Aug. 15, 1972

[54] INTERNAL COMB SOFTENING MEANS FOR BEEHIVES

[72] Inventor: John Musgrove, 629 Lebanon St., Monroe, Ohio 45050

[22] Filed: Oct. 22, 1970

[21] Appl. No.: 83,266

[52] U.S. Cl..............................................6/2, 6/11
[51] Int. Cl. ..............................................A01k 47/00
[58] Field of Search..................6/1, 2 R, 10, 11, 12 F

[56] References Cited

UNITED STATES PATENTS

| | | |
|---|---|---|
| 1,512,861 | 10/1924 | Root..............................6/11 |
| 2,324,227 | 7/1943 | Muth..............................6/11 |
| 2,631,307 | 3/1953 | Sugano..........................6/2 R |
| 2,673,358 | 3/1954 | Silva..............................6/12 F |

Primary Examiner—Lucie H. Laudenslager
Attorney—Melville, Strasser, Foster & Hoffman

[57] ABSTRACT

A beehive construction wherein the comb foundation is provided with a low voltage heating element having contacts engageable by connectors mounted on the foundation supporting brood frame, the connectors on the brood frame seating on and making electrical contact with metallic frame supporting rabbets extending along the opposite ends of the hive body, the metallic rabbets being adapted to be connected to a source of low voltage electric current.

9 Claims, 4 Drawing Figures

PATENTED AUG 15 1972

INVENTOR/S

JOHN MUSGROVE

BY *Melville, Strasser, Foster and Hoffman*
ATTORNEYS

INVENTORS
JOHN MUSGROVE

BY *Melville, Strasser, Foster and Hoffman*
ATTORNEYS 3,683,432

INTERNAL COMB SOFTENING MEANS FOR BEEHIVES

BACKGROUND OF THE INVENTION

The present invention relates to beehives and has to do more particularly with the provision of means for softening combs of honey stored in brood hives for consumption by the brood during the winter months.

In as much as honey bees do not hibernate in winter, they consume honey which has been stored in advance in the brood hive. The food calories consumed by the bees are transformed into calories of heat, and the brood temperature within the hive is normally maintained at about 93°F. When extremely cold weather is encountered, the bees often have difficulty in removing honey from the outer reaches of the hive, i.e., from the outermost brood frames. The honey, when stored, is capped with beeswax; and when the beeswax gets cold, it hardens and, in addition, the honey may become granulated. When this occurs, the bees will starve even though ample food is available within the hive, and the young brood will freeze due to the inability of the bees to generate sufficient heat to maintain the required brood temperature.

While various expedients have hitherto been proposed to artificially heat the hive, the creation of an artificial climate within the hive, particularly in the center of the hive and at its entrance, is equally detrimental to the well being of the brood and is to be avoided.

The present invention contemplates the internal softening or warming of the honey containing combs without creating a false climate in the center and at the entrance to the hive, the primary objective being to permit the bees to maintain their own environment which they are capable of doing provided the honey upon which they feed is accessible for consumption during extremely cold weather.

RESUME OF THE INVENTION

Comb softening is accomplished electrically by means of a low voltage heating element, such as one or more lengths of wire, preferably embedded in the comb foundation, with the opposite ends of the wire heating element connected to the metallic strips which normally extend along the opposite edges of the foundation to facilitate its insertion in the brood frame, such strips serving as contacts to effectively connect the heating element to a source of electric current.

The brood frame is provided at its opposite ends with connectors, preferably in the form of spring clips, which engage the metallic strips at the ends of the foundation and hence make electrical contact with the heating element. The spring clips or connectors include extensions arranged to seat on metallic brood frame supporting rabbets extending along the opposite ends of the hive body, the metallic rabbets in turn being provided with electrical contacts extending outwardly through the walls of the hive body where the contacts terminate in binding posts which may be conveniently connected to a suitable low voltage source of electric current.

The electric current may be provided by a low voltage transformer, preferably 12 volts, or by battery charge or portable generator to furnish about 5 watts per brood frame. While the length of time the combs are warmed will vary depending upon the severity of the weather, it has been found that warming the combs from 12 to 24 hours one day per week is usually sufficient.

DESCRIPTION OF THE PREFERRED EMBODIMENT

Figure 1:
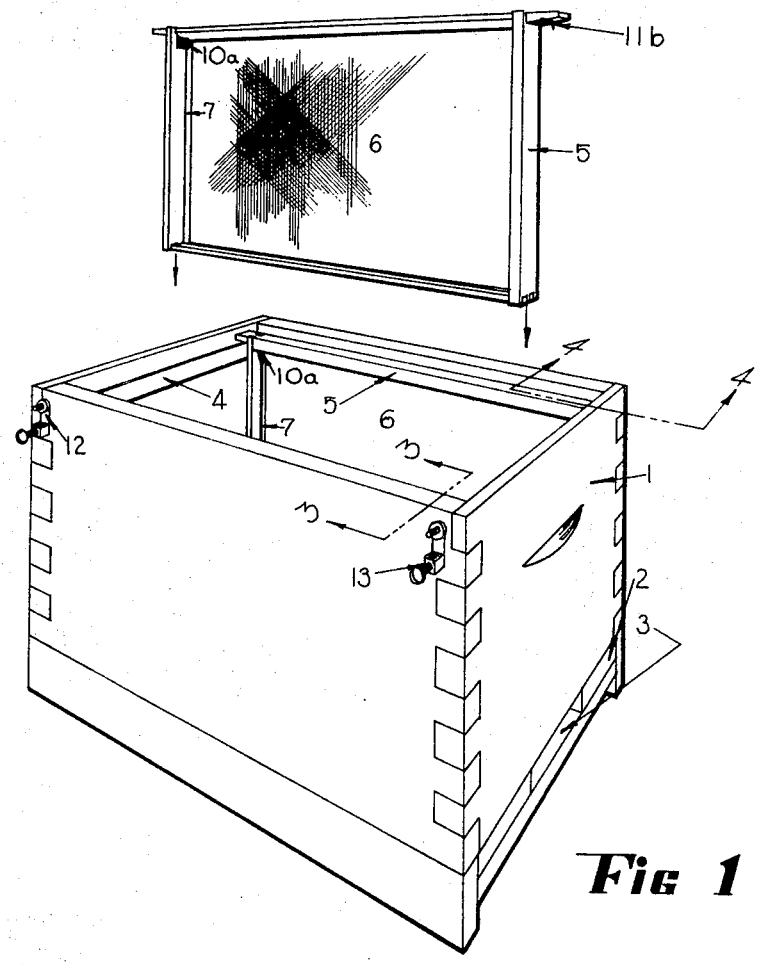
FIG. 1 is an exploded perspective view of a hive body in accordance with the invention together with a brood frame adapted to be received in the hive body.
Figure 2:
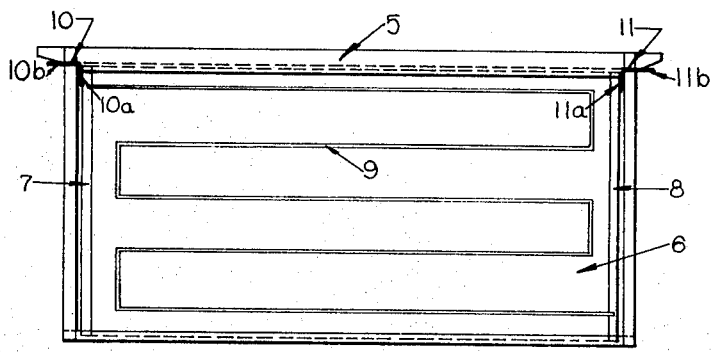
FIG. 2 is an enlarged side elevational view of a brood frame mounting a comb foundation incorporating a heating element.

Referring first to FIG. 1, a conventional hive body or super 1 is seated on a conventional bottom board 2 provided with an entrance 3. While not shown, the hive will be provided with conventional inner and outer covers which have been removed to illustrate one of the rabbets 4 which extend along the opposite ends of the hive body and serve as supports for the brood frames 5, one of which is shown seated on the rabbets 4 and the other in position to be inserted into the hive body and supported on the rabbets in side-by-side relationship to the already seated brood frame.

The brood frames 5 each mounts a comb foundation 6 formed from wax or from a wax-simulating plastic material. As will be understood by the worker in the art, the conventional brood frame is provided with detachable frame members by means of which the foundation may be secured to the frame; and customarily the foundation is provided at its opposite ends with metallic frame members 7 and 8 which reinforce and strengthen the foundation and facilitate its attachment to the brood frame.

In accordance with the present invention, the metallic frame members 7 and 8 are utilized to form contacts for the opposite ends of a wire heating element 9 which crisscrosses the foundation, the heating element being preferably embedded in the wax or other material from which the foundation is formed.

Figure 4:
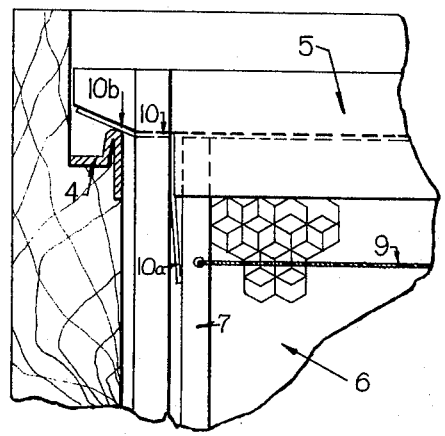
FIG. 4 is an enlarged fragmentary sectional view taken along the line 4—4 of FIG. 1 illustrating the manner in which the connectors on the brood frame makes electrical contact with the rabbets and with the comb foundation.

Connectors or clip members 10 and 11 are provided at the opposite upper ends of the brood frame, the inner ends of the connectors preferably being in the form of tongues 10a and 11a adapted to make contact with the metallic frame members 7 and 8 of the foundation 6, the connectors terminating at their opposite ends in outwardly projecting extensions 10b and 11b adapted to seat on and make electrical contact with the rabbets 4 when the brood frame is suspended within the hive body. To this end, the connectors 10 and 11 are preferably in the nature of spring clips, being formed from a conductive metal having sufficient resiliency to permit the tongues 10a and 11a to be biased outwardly for positive contact with the frame members 7 and 8 of the foundation, as will be clearly evident from FIG. 4.

Figure 3:
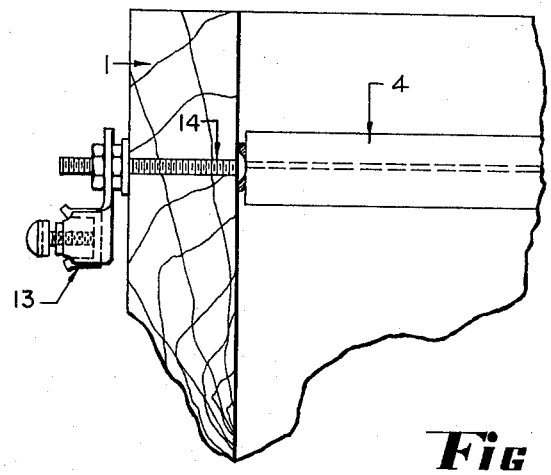
FIG. 3 is an enlarged fragmentary sectional view taken along the line 3—3 of FIG. 1 illustrating the manner in which a source of electric current is connected to the metallic brood frame supporting rabbets.

Electric current will be supplied to the rabbets 4 by means of binding posts 12 and 13 conveniently positioned on the outside of the hive body 1, the posts each including a connection, such as the threaded contact 14 seen in FIG. 3, which effects an electrical connection with the adjoining rabbet 4.

As should now be apparent, by connecting the binding posts 12 and 13 to a suitable source of low voltage current, a circuit is effected through the rabbets 4, the connectors 10, 11 and the foundation frame members 7, 8, to the heating element 9 embedded in the foundation. Upon the application of current, the heating element 9 will cause a warming of the foundation and the honey-containing comb structure constructed thereon by the bees. In the summer management of the bees, the beekeeper will see to it that the electrified brood frames are filled with honey, whereupon in fall management these frames need only be placed in the proper location within the hive, preferably four such frames (two on each side) in a conventional 10-frame super, although the quantity may be varied depending upon the anticipated severity of the winter months. The connectors mounted on the brood frame automatically insure electrical contact with the heating element when the foundation is mounted in the frame, and the mere act of seating the brood frames on the rabbets in the super effects electrical contact between the rabbets and the connectors. Consequently, the beekeeper need not be concerned about special connections or other time consuming manipulations to effectively wire the hive, it only being necessary to connect the binding posts 12 and 13 to a source of low voltage current when comb warming is desired.

Modifications may be made in the invention without departing from its spirit and purpose. For example, the connectors which electrically interconnect the rabbets and the foundation may take diverse forms and shapes, the essential consideration being to effect a positive electrical connection between the parts. While the wire heating element 9 will be preferably embedded in the foundation, it may be applied to one surface thereof and held in place by any suitable attachment means. Similarly, instead of a single wire element crisscrossing the foundation, a plurality of wire elements may be employed, each with its opposite ends connected to the frame members at the ends of the foundation. In place of metallic rabbets of the configuration illustrated, metallic contact strips may be extended along and secured to the upper surfaces of conventional wooden rabbets to make electrical contact with the under surfaces of the outwardly projecting extensions of the connectors which underlie the extending end edges of the brood frame.

The embodiments of the invention in which an exclusive property or privilege is claimed are defined as follows:

1. In a beehive construction, a rectangular hive body, metallic rabbets extending along the opposite ends of said hive body, means for connecting said metallic rabbets to a source of low voltage electric current, at least one brood frame adapted to be suspended within said hive body from said rabbets, said brood frame mounting a comb foundation, a wire heating element embedded in said foundation, electrical contacts at the opposite ends of said wire heating element, connectors mounted on said brood frame, said conncetors having inner portions thereof positioned to engage the electrical contacts at the opposite ends of said foundation and outer portions thereof positioned to contact said metallic rabbets when said brood frame is suspended within said hive body.

2. The beehive construction claimed in claim 1 wherein said connectors comprise spring metal members the inner portions of which comprise tongues biased to engage the electrical contacts of said heating element, said outer portions comprising outwardly projecting extensions adapted to seat on said rabbets.

3. The beehive construction claimed in claim 2 wherein the electrical contacts on the opposite ends of said wire heating element comprise metallic frame members extending along the opposite ends of said foundation.

4. The beehive construction claimed in claim 3 wherein the means for connecting said metallic rabbets to a source of low voltage electric current comprises binding posts projecting outwardly from the wall of said hive body.

5. For use in a beehive having a brood frame including connectors for connecting said brood frame to a source of low voltage electric current, a comb foundation adapted to be mounted in said brood frame, said foundation having an electric wire heating element embedded therein, and electrical contacts connected to the opposite ends of said wire heating element, said electrical contacts being positioned to engage the connectors on said brood frame when said foundation is mounted in said brood frame.

6. The comb foundation claimed in claim 5 wherein the electrical contacts at the opposite ends of said wire heating element comprise metallic frame members extending along the opposite end edges of said foundation.

7. For use in a beehive having a hive body including contact means for connecting a brood frame suspended therein to a source of electric current, a brood frame adapted to be suspended within said hive body, connectors mounted on said brood frame, said connectors being positioned to engage said contact means to effect an electrical connection between said hive body and said brood frame, said connectors having portions thereof positioned to effect an electrical connection between said brood frame and the contacts of an electric heating element incorporated in a comb foundation adapted to be mounted in said brood frame.

8. The brood frame claimed in claim 7 wherein the portions of said connectors positioned to effect an electrical connection with the contacts of the heating element comprise resilient tongues biased to engage the contacts carried by the comb foundation.

9. The brood frame claimed in claim 8 wherein said connectors include outwardly projecting extensions adapted to seat on rabbets secured to the inner wall surfaces of the hive body which serve as contact means for connecting said brood frame to a source of electric current.

* * * * *